US009323990B2

(12) United States Patent
Sun et al.

(10) Patent No.: US 9,323,990 B2
(45) Date of Patent: Apr. 26, 2016

(54) FULL-AUTOMATIC DETECTION METHOD AND SYSTEM FOR STATIC CHARACTERISTIC INFORMATION IN DYNAMIC IMAGE

(71) Applicant: MONTAGE TECHNOLOGY (SHANGHAI) CO., LTD., Shanghai (CN)

(72) Inventors: Binxuan Sun, Shanghai (CN); Cheng-Tie Chen, Shanghai (CN); Xiaodong Huang, Shanghai (CN); Ke Wu, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 183 days.

(21) Appl. No.: 14/257,270

(22) Filed: Apr. 21, 2014

(65) Prior Publication Data

US 2015/0186731 A1    Jul. 2, 2015

(30) Foreign Application Priority Data

Dec. 31, 2013    (CN) .......................... 2013 1 0753826

(51) Int. Cl.
*H04N 19/139*        (2014.01)
*G06K 9/00*          (2006.01)
(52) U.S. Cl.
CPC ........ *G06K 9/00744* (2013.01); *G06K 2209/25* (2013.01)

(58) Field of Classification Search
None
See application file for complete search history.

(56) References Cited

U.S. PATENT DOCUMENTS

| 6,100,941 A * | 8/2000 | Dimitrova ......... G06F 17/30814 348/700 |
| 2011/0043688 A1* | 2/2011 | Wang ................... H04N 7/0115 348/448 |
| 2012/0044998 A1* | 2/2012 | Kokaram .............. G06T 7/2006 375/240.16 |

* cited by examiner

*Primary Examiner* — Stephen R Koziol
*Assistant Examiner* — Raphael Schwartz
(74) *Attorney, Agent, or Firm* — Oliff PLC

(57) ABSTRACT

According to a method in the present invention, first whether an inter-frame difference for each pixel in predetermined first region and second region in the dynamic image exceeds a predetermined threshold is judged to determine whether the pixel is a static information point, and when, in the second region, pixels in regions not overlapping with the first region are determined as non-static information points, judgment on the inter-frame difference and the predetermined threshold is stopped; and then static characteristic information in the dynamic image is determined based on the static information points in the first region. Preferably, the inter-frame difference for each pixel in the first region may be re-judged based on an adjusted predetermined threshold, to further determine the static characteristic information in the dynamic image, so that static opaque static characteristic information or static characteristic information with arbitrary degrees of transparency in the dynamic image can be detected.

14 Claims, 3 Drawing Sheets

FULL-AUTOMATIC DETECTION METHOD AND SYSTEM FOR STATIC CHARACTERISTIC INFORMATION IN DYNAMIC IMAGE

BACKGROUND OF THE PRESENT INVENTION

1. Field of Invention

The present invention relates to the field of video image detection, and particularly to a full-automatic detection method and system for static characteristic information in a dynamic image.

2. Description of Related Arts

In general, the static characteristic information in TV videos, such as station logos or other overlay icons and characters, always have different colors and frequency characteristics from video content. Therefore, the processing effect is probably far from satisfactory if an identical algorithm for the video content is adopted during post-processing. In addition, the high frequency characteristics of the icons always result in compression noise, such as mosquito-noise, during video compression or transmission process. On the other hand, the interference between static icon regions and video backgrounds may lead to erroneous estimation of image motion vectors around the icon regions during video de-interlacing operation.

In order to detect the overlay icons and characters, an existing detection method via calculating the inter-frame difference was available and seemed easy to operate due to the relatively-fixed positions of the overlay icons in the video. However, such detection method still has several disadvantages. For example, it seems impossible to obtain a comprehensive statistical results which contain the statistical data for all cases as sizes and shapes of the icons usually change significantly. In addition, some icons per se have different transparency degrees, which means that pixel values of the icons may vary with background pixel values, thus the inter-frame difference between the icons which have different background is no longer a fixed value. Therefore, it is difficult to detect opaque icons and icons with arbitrary transparency degrees by such detection method.

In the prior art, another icon detection method via edge detection is also used. This technology utilizes the characteristics that an icon region is stationary in time and space relative to a video region, takes video sequences as input, and detects changes in edges of an image to distinguish the icon region from a video content region. However, this method cannot automatically judge whether an icon region has been detected and thus cannot stop the detection operation automatically.

SUMMARY OF THE PRESENT INVENTION

In view of the above disadvantages of the prior art, an objective of the present invention is to provide a full-automatic detection method and system for static characteristic information in a dynamic image which is easy to be implemented.

In order to accomplish the above objective and other relevant objectives, the present invention provides a full-automatic detection method for static characteristic information in a dynamic image, at least comprising:

1. judging whether an pixel is a static information pixel or not by comparing the inter-frame difference with a predetermined threshold in a predetermined first region and second region; the judging process is stopped when the pixels in the non overlap region of the first and second region is judged as non-static information points; and 2. determining static characteristic information in the dynamic image based on the static information points in the first region.

Preferably, when the static information points in the first region are determined as belonging to the static characteristic information in the dynamic image, the steps 1 and 2 are repeated based on an adjusted predetermined threshold.

Preferably, the full-automatic detection method for static characteristic information in a dynamic image further comprises:

detecting background information points in the static information points based on a horizontal frequency; and the step 2 is proceeded as follows: determining the static characteristic info nation in the dynamic image based on static information points in the first region which are not background information points.

Preferably, the full-automatic detection method for static characteristic information in a dynamic image further comprises: synthesizing the static characteristic information obtained after multiple times of determination operations to obtain ultimate static characteristic information.

Preferably, the first region is comprised within the second region, the first region and the second region overlap partially or do not overlap at all.

The present invention further provides a full-automatic detection system for static characteristic information in a dynamic image, at least comprising:

a judgment module, determining whether the pixel is a static information point by judging whether an inter-frame difference for each pixel in a predetermined first region and second region in the dynamic image exceeds a predetermined threshold, and stopping the judgment operation between the inter-frame difference and the predetermined threshold when all the pixels in a specific region within the second region and not overlapping with the first region are determined as non-static information points; and a determination module, for determining static characteristic information in the dynamic image based on the static information points in the first region.

Preferably, when the static information points in the first region are determined as belonging to the static characteristic information in the dynamic image, the judgment module and the determination module repetitively perform respective operations based on an adjusted predetermined threshold.

Preferably, the full-automatic detection system for static characteristic information in a dynamic image further comprises:

a detection module, for detecting background information points in the static information points based on a horizontal frequency;

and, the determination module is further used for determining the static characteristic information in the dynamic image based on static information points in the first region which are not background information points.

Preferably, the full-automatic detection system for static characteristic information in a dynamic image further comprises: a synthesis module, for synthesizing the static characteristic information obtained after multiple times of determination operations to obtain ultimate static characteristic information.

As stated above, the full-automatic detection method and system for static characteristic information in a dynamic image in the present invention have the following beneficial effects: static opaque characteristic information or static characteristic information with arbitrary degrees of transparency in the dynamic image can be detected, such as TV station logo information in a video image, and they also have characteristics such as full automation, high detection precision and strong self-adaptability.

DESCRIPTION ABOUT REFERENCE SIGNS

A1, A2, A3, A11 Second region
B1, B2, B3, B11 First region
a11 Region in the second region not overlapping with the first region
1 Full-automatic detection system
11 Judgment module
12 Determination module
S1-S2 Steps

DETAILED DESCRIPTION OF THE PREFERRED EMBODIMENTS

Embodiments of the present invention are described below through particular specific examples, and persons skilled in the art may easily understand other advantages and efficacies of the present invention according to the disclosure of the specification. The present invention can also be practiced or applied through other different specific embodiments, and details in the specification can also be modified or varied based on different viewpoints and applications without departing from the spirit of the present invention.

Please refer to FIG. 1 to FIG. 5. It should be noted that, the figures provided in this embodiment only describes the basic concept of the present invention schematically, thus the figures only show components relevant to the present invention instead of being drawn according to the number, shapes and sizes of the components in actual implementation, the type, the number and the proportion of each component in actual implementation may be an arbitrary change, and the layout of the components may also be more complicated.

Figure 1:
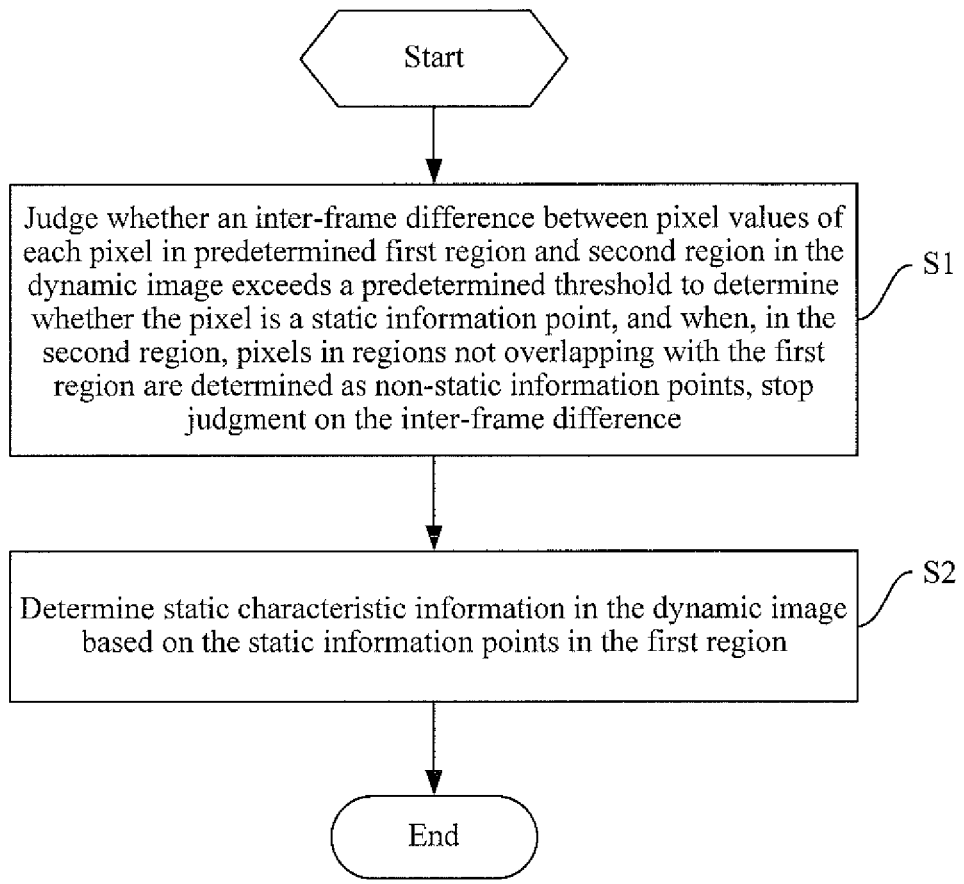
FIG. 1 is a flow chart of a full-automatic detection method for static characteristic information in a dynamic image consistent with the present invention.

As shown in FIG. 1, the present invention provides a full-automatic detection method for static characteristic information in a dynamic image. The method according to the present invention is mainly accomplished through a full-automatic detection system, and the full-automatic detection system includes, but is not limited to, an application module, a processing controller and the like that can implement the solution of the present invention. The application module is loaded in a device such as a computer, a single network server, a server group consisting of multiple network servers, or a cloud computing-based device consisting of a large number of computers or network servers, wherein the cloud computing is a kind of distributed computing, which is a super virtual computer formed by a group of loosely coupled computer sets.

In step S1, the full-automatic detection system judges whether an inter-frame difference for each pixel in predetermined first region and second region in the dynamic image exceeds a predetermined threshold to determine whether the pixel is a static information point, and when, in the second region, pixels in regions not overlapping with the first region are determined as non-static information points, stops judgment on the inter-frame difference.

Specifically, the full-automatic detection system judges whether a difference between a pixel value M(i) of an ith frame and a pixel value M(i+j) of an (i+j)th frame for each pixel in the first region and the second region exceeds a predetermined threshold, if yes, determines that the pixel is a non-static information point, if not, determines that the pixel is a static information point, and after the difference between the pixel value M(i) of the ith frame and the pixel value M(i+j) of the (i+j)th frame for each pixel in the first region is compared with the predetermined threshold, judges whether all pixels in a region within the second region not overlapping with the first region are determined as non-static information points, if yes, no longer compares the inter-frame difference between respective pixels in the first region and the second region in kth frame and (k+n)th frame images with the predetermined threshold, or otherwise, continues comparing the inter-frame difference between respective pixels in the first region and the second region in the kth frame and (k+n)th frame images with the predetermined threshold until all the pixels in the region of the second region not overlapping with the first region are determined as non-static information points, wherein j and n are integers greater than or equal to 1, and k is an integer not equal to i or i+j.

The first region is a region where the static characteristic information in the dynamic image possibly exists, and the second region is a region where the static characteristic information in the dynamic image is unlikely to exist; and the static characteristic information is information unchanged in the dynamic image, such as TV station logo information in a video image.

The size and the position of the first region may be determined by statistics, for example, in order to detect TV station logo information in a video image, the size and the position of the first region may be determined by finding out and thus making statistics on all of the possible regions where TV station logo information may located.

It should be noted that, as the TV station logo information may probably appear in upper left, upper right, lower left, lower right and such regions on a display screen, the first region should generally cover these regions (upper left, upper right, lower left, lower right and so on) in the display screen as above mentioned.

Figure 2A:
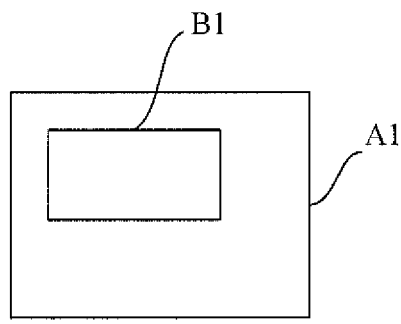
FIGS. 2a to 2c are schematic views of a position relationship between a first region and a second region consistent with the present invention.
Figure 2B:
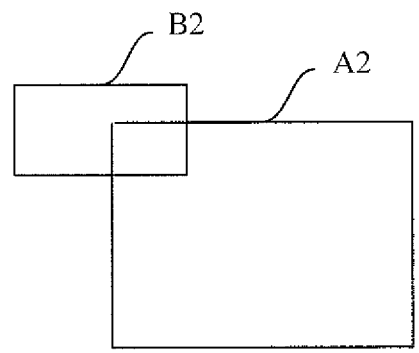
Figure 2C:
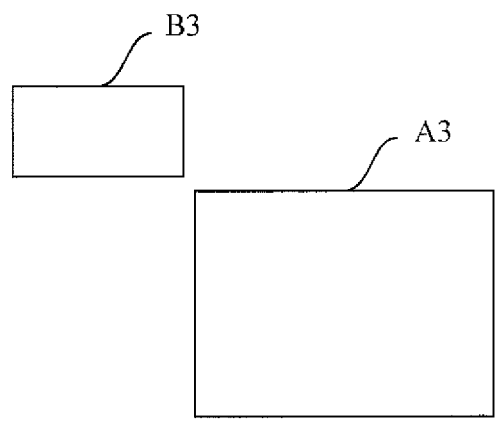

The size and the position of the second region may be set based on regions where the static characteristic information in the image is unlikely to exist, and the second region may include the first region, for example, as shown in FIG. 2a which is a schematic view that a second region A1 contains a first region B1; for another example, as shown in FIG. 2b which is a schematic view that a second region A2 contains part of a first region B2 (partially overlapping); and for a further example, as shown in FIG. 2c which is a schematic view that a second region A3 and a first region B3 do not overlap.

It should be noted that, the above description is only illustrative, but is not intended to limit the present invention. In fact, the position relationship and shapes of the first region and the second region are not limited to the illustration, for example, the first region may be oval, the second region may be trapezoidal and the like, for another example, if the first region includes 4 sub-regions respectively located in upper left, upper right, lower left and lower right parts of the display screen, the second region may also include the 4 sub-regions, or only be a single region or the like.

In addition, it should be further noted that, if the first region includes multiple sub-regions, a parallel manner may be adopted to simultaneously perform operations of comparing inter-frame differences between pixels in each sub-region with the predetermined threshold, and a serial manner may also be adopted to sequentially perform the operations of comparing inter-frame differences between pixels in each sub-region with the predetermined threshold.

Figure 3:
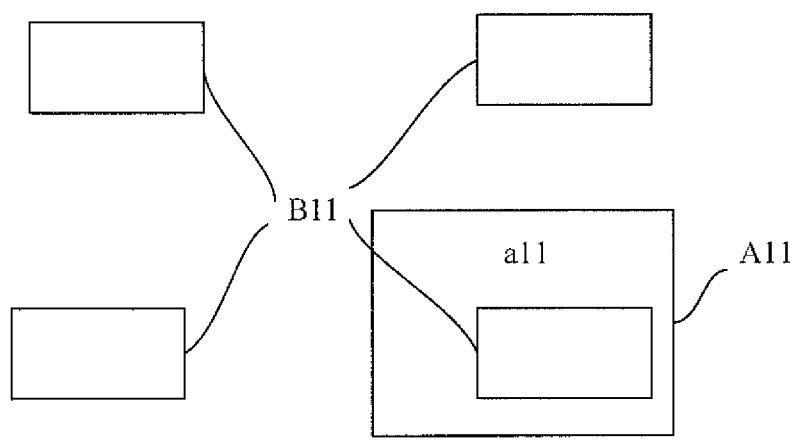
FIG. 3 is a schematic view of a first region and a second region used in the full-automatic detection method for static characteristic information in a dynamic image consistent with the present invention.

For example, as shown in FIG. 3, the full-automatic detection system judges whether a difference between a pixel value M(1) of a first frame and a pixel value M(2) of a second frame for each pixel in a first region B11 and a second region A11 exceeds a predetermined threshold, if yes, determines that the pixel is a non-static information point, and if not, determines that the pixel is a static information point, and after all the pixels in the first region B11 are distinguished as static information points or non-static information points, the full-automatic detection system judges again whether all pixels in a region a11 in the second region A11 not overlapping with the first region B11 are determined as non-static information points, if not, the full-automatic detection system continues judging whether a difference between a pixel value M(3) of a third frame and a pixel value M(4) of a fourth frame for each pixel in the first region B11 and the second region A11 exceeds the predetermined threshold, and after all the pixels in the first region B11 are distinguished as static information points or non-static information points, the full-automatic detection system judges again whether all the pixels in the region a11 are determined as non-static information points, if yes, stops the operation of judging the inter-frame difference and the predetermined threshold, and makes statistics on pixels in the first region determined twice as static information points.

Next, in step S2, the full-automatic detection system determines static characteristic information in the dynamic image based on the static information points in the first region.

Specifically, the full-automatic detection system determines, based on sizes of regions occupied by the pixels in the first region determined as static information points, whether these pixels belong to the static characteristic information in the dynamic image, that is, if the sizes of the regions occupied by the pixels are far less than the minimum size of the static characteristic information such as TV station logo information, it is considered that the pixels do not belong to the static characteristic information in the dynamic image, and if not, it is determined that the static characteristic information in the dynamic image has been detected.

In addition, considering that the static characteristic information in the dynamic image such as a TV station logo may have a certain degree of transparency, in order to prevent "erroneous judgment", for example, some static information points might be mistaken for non-static information points in case of a too-small value being predetermined as threshold, In this case, the full-automatic detection system performs the operation of comparing an inter-frame difference of pixel values for each pixel in the first region with an adjusted threshold again based on the adjusted threshold, so as to re-determine the static information points in the first region, and then determine all static characteristic information in the dynamic image based on the re-determined static information points in the first region.

Figure 4:
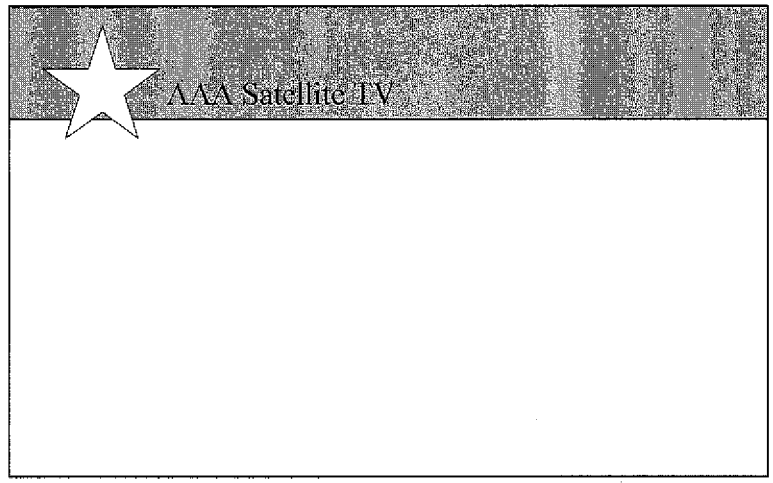
FIG. 4 is a schematic view of static characteristic information and background information in a dynamic image.

Moreover, considering that background colors in regions where static characteristic information is located may not change in a long time, for example, as shown in FIG. 4, in the video image, TV station logo information on the top of the display screen, that is, the five-pointed star and the words "AAA Satellite TV" as well as the gray bar as the background remain unchanged, and in order to avoid that the background information is also determined as static characteristic information by mistake, the full-automatic detection system further detects background information points in the static information points based on a horizontal frequency, that is, if a mean square deviation between a pixel value of a pixel and pixel values of several neighboring pixels is less than a predetermined variance threshold, the full-automatic detection system judges that the pixel is a background information point; and then determines the static characteristic information in the dynamic image based on static information points in the first region which are not background information points.

The manner of determining the static characteristic information in the dynamic image based on static information points in the first region which are not background information points is identical with or similar to that of determining the static characteristic information in the dynamic image based on static information points in the first region, and is included herein in a reference manner, which is not detailed any more.

More preferably, in order to further improve detection precision, the full-automatic detection system synthesizes the static characteristic information determined multiple times to ultimately determine the static characteristic information in the dynamic image.

The manner of synthesizing the static characteristic information determined multiple times includes any manner capable of synthesizing the static characteristic information determined multiple times, which, preferably, includes, but is not limited to, processing with a predetermined weighting algorithm and the like.

Figure 5:
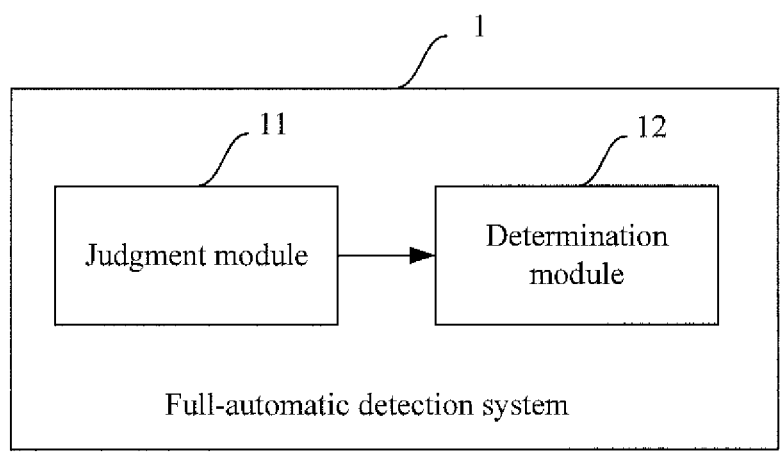
FIG. 5 is a schematic view of a full-automatic detection system for static characteristic information in a dynamic image consistent with the present invention.

As shown in FIG. 5, the present invention provides a full-automatic detection system for static characteristic information in a dynamic image. The full-automatic detection system 1 at least includes: a judgment module 11 and a determination module 12.

The judgment module 11 judges whether an inter-frame difference for each pixel in predetermined first region and second region in the dynamic image exceeds a predetermined threshold to determine whether the pixel is a static information point, and when, in the second region, pixels in regions not overlapping with the first region are determined as non-static information points, stops judgment on the inter-frame difference.

Specifically, the judgment module 11 judges whether a difference between a pixel value M(i) of an ith frame and a pixel value M(i+j) of an (i+j)th frame for each pixel in the first region and the second region exceeds a predetermined threshold, if yes, determines that the pixel is a non-static information point, if not, determines that the pixel is a static information point, and after the difference between the pixel value M(i) of the ith frame and the pixel value M(i+j) of the (i+j)th frame for each pixel in the first region is compared with the predetermined threshold, judges whether all pixels in a region of the second region not overlapping with the first region are determined as non-static information points, if yes, no longer compares the inter-frame difference between respective pixels in the first region and the second region in kth frame and (k+n)th frame images with the predetermined threshold, or otherwise, continues comparing the inter-frame difference between respective pixels in the first region and the second region in the kth frame and (k+n)th frame images with the predetermined threshold until all the pixels in the region of the second region not overlapping with the first region are determined as non-static information points, where j and n are integers greater than or equal to 1, and k is an integer not equal to i or i+j.

The first region is a region where the static characteristic information in the dynamic image possibly exists, and the second region is a region where the static characteristic information in the dynamic image is unlikely to exist; and the static characteristic information is information unchanged in the dynamic image, such as TV station logo information in a video image.

The size and the position of the first region may be determined by statistics, for example, in order to detect TV station logo information in a video image, the size and the position of the first region may be determined by making statistics on all regions where the TV station logo information is located.

It should be noted that, as the TV station logo information may appear in upper left, upper right, lower left, lower right and other regions on a display screen, the first region usually should cover the regions of the display screen.

The size and the position of the second region may be set based on regions where the static characteristic information in the image is unlikely to exist, and the second region may include the first region, for example, as shown in FIG. 2a which is a schematic view that a second region A1 includes a first region B1; for another example, as shown in FIG. 2b which is a schematic view that a second region A2 includes part of a first region B2; and for a further example, as shown in FIG. 2c which is a schematic view that a second region A3 and a first region B3 do not overlap.

It should be noted that, the above description is only illustrative, but is not intended to limit the present invention. In fact, the position relationship and shapes of the first region and the second region are not limited to the illustration, for example, the first region may be oval, the second region may be trapezoidal and the like, for another example, if the first region includes 4 sub-regions respectively located in upper left, upper right, lower left and lower right parts of the display screen, the second region may also include the 4 sub-regions, or only be a single region or the like.

In addition, it should be further noted that, if the first region includes multiple sub-regions, a parallel manner may be adopted to simultaneously perform operations of comparing inter-frame differences between pixels in each sub-region with the predetermined threshold, and a serial manner may also be adopted to sequentially perform the operations of comparing inter-frame differences between pixels in each sub-region with the predetermined threshold.

For example, as shown in FIG. 3, the judgment module 11 judges whether a difference between a pixel value M(1) of a first frame and a pixel value M(2) of a second frame for each pixel in a first region B11 and a second region A11 exceeds a predetermined threshold, if yes, determines that the pixel is a non-static information point, and if not, determines that the pixel is a static information point, and after all the pixels in the first region B11 are distinguished as static information points or non-static information points, the judgment module 11 judges again whether all pixels in a region a11 in the second region A11 not overlapping with the first region B11 are determined as non-static information points, if not, the judgment module 11 continues judging whether a difference between a pixel value M(3) of a third frame and a pixel value M(4) of a fourth frame for each pixel in the first region B11 and the second region A11 exceeds the predetermined threshold, and after all the pixels in the first region B11 are distinguished as static information points or non-static information points, the judgment module 11 judges again whether all the pixels in the region a11 are determined as non-static information points, if yes, stops the operation of judging the inter-frame difference and the predetermined threshold, and makes statistics on pixels in the first region determined twice as static information points.

Next, the determination module 12 determines static characteristic information in the dynamic image based on the static information points in the first region.

Specifically, the determination module 12 determines, based on sizes of regions occupied by the pixels in the first region determined as static information points each time in the operation of judging the inter-frame difference and the predetermined threshold, whether these pixels belong to the static characteristic information in the dynamic image, that is, if the sizes of the regions occupied by the pixels are far less than the minimum size of the static characteristic information such as TV station logo information, it is considered that the pixels do not belong to the static characteristic information in the dynamic image, and if not, it is determined that the static characteristic information in the dynamic image has been detected.

In addition, considering that the static characteristic information in the dynamic image such as a TV station logo may have a certain degree of transparency, in order to prevent that the predetermined threshold to be compared with the inter-frame difference in the judgment module 11 is too small so as to result in that part of the static information points is determined as non-static information points, after the determination module 12 determines that the static information points in the first region belong to the static characteristic information in the dynamic image, the judgment module 11 performs the operation of comparing an inter-frame difference of pixel values for each pixel in the first region with an adjusted threshold again based on the adjusted predetermined threshold, and then the determination module 12 determines all static characteristic information in the dynamic image based on the re-determined static information points in the first region.

Moreover, considering that background colors in regions where static characteristic information in some dynamic images is located may not change in a long time, for example, as shown in FIG. 4, in the video image, TV station logo information on the top of the display screen, that is, the five-pointed star and the words "AAA satellite TV" as well as the gray bar as the background remain unchanged, and in order to avoid that the background information is also determined as static characteristic information, the full-automatic detection system 1 further includes a detection module.

The detection module detects background information points in the static information points based on a horizontal frequency, that is, if a mean square deviation between a pixel value of a pixel and pixel values of several neighboring pixels is less than a predetermined variance threshold, the detection module judges that the pixel is a background information point; and then the determination module 12 determines the static characteristic information in the dynamic image based on static information points in the first region which are not background information points.

The manner of determining the static characteristic information in the dynamic image based on static information points in the first region which are not background information points is identical with or similar to that of determining the static characteristic information in the dynamic image based on static information points in the first region, and is included herein in a reference manner, which is not detailed any more.

More preferably, in order to further improve detection precision, the determination module 12 synthesizes the static characteristic information determined multiple times to ultimately determine the static characteristic information in the dynamic image.

The manner of synthesizing the static characteristic information determined multiple times includes any manner capable of synthesizing the static characteristic information determined multiple times, which, preferably, includes, but is not limited to, processing with a predetermined weighting algorithm and the like.

To sum up, the full-automatic detection method and system for static characteristic information in a dynamic image in the present invention use a judgment result of the region where the non-static characteristic information is located as a basis for determining that the static characteristic information has been detected, instead of using statistical information of the static characteristic information per se, so that the method can stably detect the static characteristic information of different sizes, positions, degrees of transparency and shapes. Therefore, the present invention effectively overcomes various disadvantages in the prior art and has a highly industrial utilization value.

The above embodiments only exemplarily describe the principles and effects of the present invention, but are not intended to limit the present invention. Any person skilled in the art can make modifications or variations to the embodiments without departing from the spirit and scope of the present invention. Accordingly, all equivalent modifications or variations completed by persons having ordinary skill in the art without departing from the spirit and technical thought of the disclosure of the present invention should fall within the scope defined by the appended claims of the present invention.

What is claimed:

1. A full-automatic detection method for static characteristic information in a dynamic image, wherein the full-automatic detection method for static characteristic information in a dynamic image at least comprises:
   (1) judging whether a pixel is a static information pixel or not by comparing an inter-frame difference with a predetermined threshold in a predetermined first region and second region; the judging process is stopped when the pixels in the non overlap region of the first and second region are judged as non-static information points; and
   (2) determining static characteristic information in the dynamic image based on the static information points in the first region;
   wherein when the static information points in the first region are determined as belonging to the static characteristic information in the dynamic image, the steps (1) and (2) are repeated based on an adjusted predetermined threshold.

2. The full-automatic detection method for static characteristic information in a dynamic image as in claim 1, further comprising:
   detecting background information points in the static information points based on a horizontal frequency,
   wherein the step (2) is proceeded as follows: determining the static characteristic information in the dynamic image based on static information points in the first region which are not background information points.

3. The full-automatic detection method for static characteristic information in a dynamic image as in claim 1, further comprising:
   synthesizing the static characteristic information obtained after multiple times of determination operations to obtain ultimate static characteristic information.

4. The full-automatic detection method for static characteristic information in a dynamic image as in claim 1, wherein the first region is contained within the second region.

5. The full-automatic detection method for static characteristic information in a dynamic image as in claim 1, wherein the first region and the second region overlap partially or do not overlap at all.

6. A full-automatic detection system for static characteristic information in a dynamic image, wherein the full-automatic detection system for static characteristic information in a dynamic image at least comprises:
   a judgment module, for judging whether an inter-frame difference for each pixel in a predetermined first region and second region in the dynamic image exceeds a predetermined threshold to determine whether the pixel is a static information point, and stopping the judgment operation between the inter-frame difference and the predetermined threshold when all the pixels in a specific region within the second region and not overlapping with the first region are determined as non-static information points; and
   a determination module, for determining static characteristic information in the dynamic image based on the static information points in the first region;
   wherein when the static information points in the first region are determined as belonging to the static characteristic information in the dynamic image, the judgment module and the determination module repetitively perform respective operations based on an adjusted predetermined threshold.

7. The full-automatic detection system for static characteristic information in a dynamic image as in claim 6, further comprising:
   a detection module, for detecting background information points in the static information points based on a horizontal frequency;
   wherein the determination module is further used for:
   determining the static characteristic information in the dynamic image based on static information points in the first region which are not background information points.

8. The full-automatic detection system for static characteristic information in a dynamic image as in claim 6, further comprising:
   a synthesis module, for synthesizing the static characteristic information obtained after multiple times of determination operations to obtain ultimate static characteristic information.

9. The full-automatic detection system for static characteristic information in a dynamic image as in claim 6, wherein the first region is contained within the second region.

10. The full-automatic detection system for static characteristic information in a dynamic image as in claim 6, wherein the first region and the second region overlap partially or do not overlap at all.

11. The full-automatic detection method for static characteristic information in a dynamic image as in claim 1, further comprising:
    detecting background information points in the static information points based on a horizontal frequency, wherein the step (2) is proceeded as follows: determining the static characteristic information in the dynamic image based on static information points in the first region which are not background information points.

12. The full-automatic detection method for static characteristic information in a dynamic image as in claim 1, further comprising:
synthesizing the static characteristic information obtained after multiple times of determination operations to obtain ultimate static characteristic information.

13. The full-automatic detection system for static characteristic information in a dynamic image as in claim 6, further comprising:
a detection module, for detecting background information points in the static information points based on a horizontal frequency;
wherein the determination module is further used for:
determining the static characteristic information in the dynamic image based on static information points in the first region which are not background information points.

14. The full-automatic detection system for static characteristic information in a dynamic image as in claim 6, further comprising:
a synthesis module, for synthesizing the static characteristic information obtained after multiple times of determination operations to obtain ultimate static characteristic information.

* * * * *